UNITED STATES PATENT OFFICE.

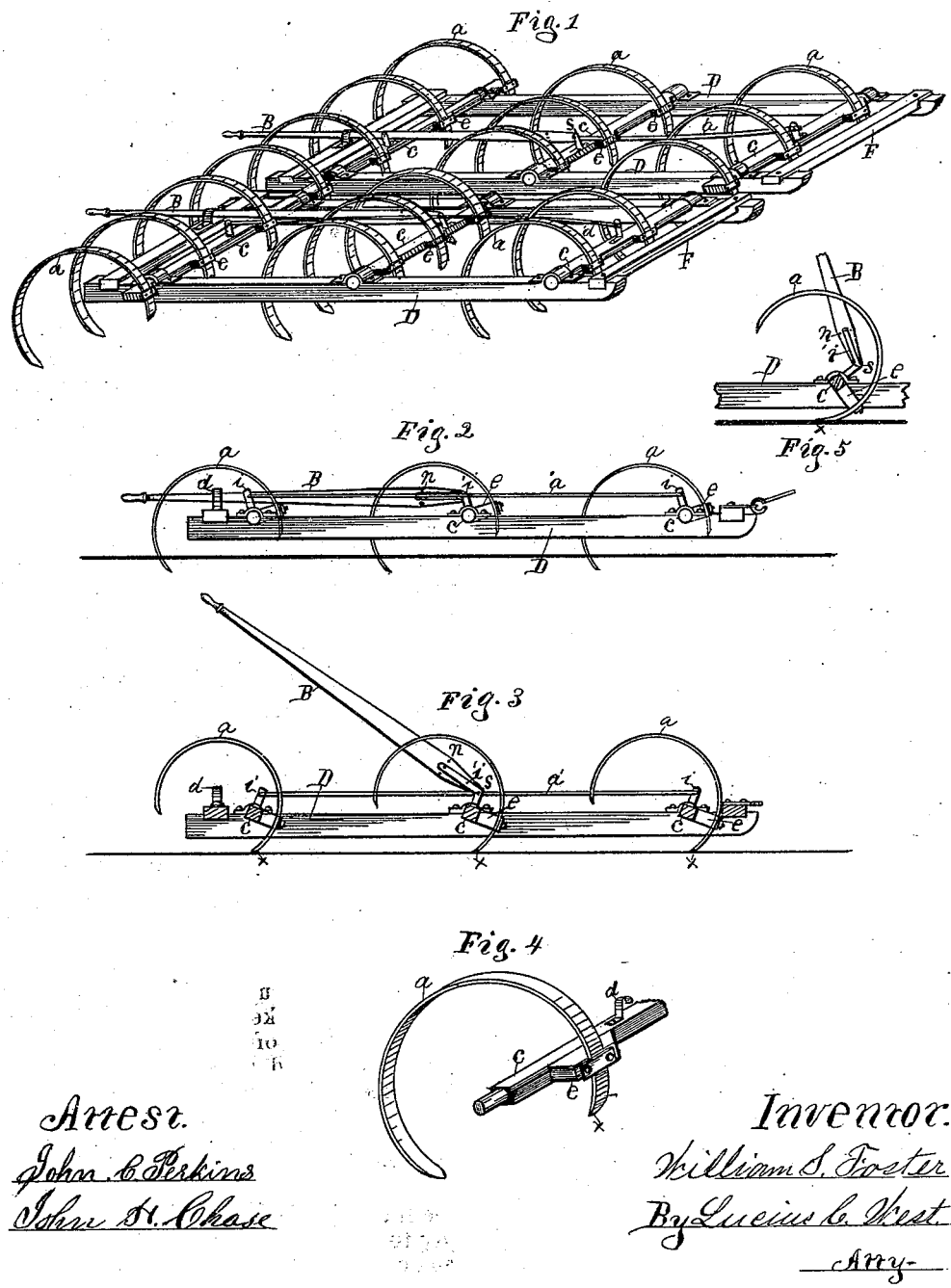

WILLIAM S. FOSTER, OF KALAMAZOO, MICHIGAN.

SPRING-TOOTH HARROW.

SPECIFICATION forming part of Letters Patent No. 251,208, dated December 20, 1881.

Application filed April 12, 1881. (No model.)

*To all whom it may concern:*

Be it known that I, WILLIAM S. FOSTER, a citizen of the United States, residing at Kalamazoo, county of Kalamazoo, State of Michigan, have invented a new and useful Spring-Tooth Harrow, of which the following is a specification.

The object of my invention consists in certain improvements in the construction of harrow-frames which are provided with revoluble tooth-beams, and in combining with said improved frame the spring-teeth patented to me in the United States May 18, 1880, all in a manner whereby said teeth are made operative in effecting useful results not otherwise attained with them.

The construction embodying my invention consists in a frame provided with revoluble tooth-beams, which have projecting portions on their front side extending upwardly at an oblique angle, to which projecting portions the teeth, made in the form of about three-fourths of a circle, double pointed, adjustable, and reversible, are secured, with their forward ends extending below said projecting portions of the beams, as shown.

Other features of the construction pertaining to the successful operation of my complete device will appear in the following detailed description.

In the accompanying drawings, forming a part of this specification, in which similar letters of reference point out like parts, Figure 1 is a perspective view of my improved harrow complete; Fig. 2, a side view; Fig. 3, a longitudinal section near the line of the lever-arm in Fig. 1; Fig. 4, a perspective of the tooth and connections on an enlarged scale; and Fig. 5, a detached portion of Fig. 3, showing the lever-arm and tooth at a different angle.

D D are the side beams of the frame, which, if desired, may be made in the form of runners, to assist in guiding and steadying the frame when the teeth are operating in the soil.

*c* are revoluble beams of the usual construction, except the obliquely-extending portions *e e*, Fig. 2, to which the teeth *a* are secured by a bar or plate of iron and bolts in the common manner; but owing to the position and angle of my teeth these fastening-bars may be made of light castings, as but little strength is required, thus effecting a saving in expense.

The advantages attained by connecting the teeth of this construction to the obliquely-extended portions or seats *e* is that it in effect locates the connection nearer to the center of the circular tooth, rendering great assistance in the movement of the lever-arm B, operating the revoluble beams in carrying out the several results effected by my construction all in one device—viz., controlling the depth of cut, raising the end of the tooth from the soil to pass obstructions, or raising said end and the frame together by converting the end *x* into a fulcrum, in freeing the frame-beams of any collected litter, Fig. 3, and in converting said end *x* into a shoe for supporting the frame when drawing it from the field, Fig. 5.

Another important advantage in connecting the teeth *a* with the portion *e* is that said teeth are located at an angle, whereby their working end assumes a more practical position in the soil.

A further important result effected by my construction is that when the forward points of the teeth are thrown in the position shown in Fig. 3 it makes a very practical device for harrowing a field of growing grain in the spring, either for the purpose of cultivation or in seeding the ground among the grain to grass or clover, for the reason that as said forward points curve away from the direction of transit instead of toward it, as do the rear marking-points, the ground is scratched over by said forward points without digging out the grain, as would be the case if the rear points were used for this purpose. Farmers using spring-tooth harrows are now obliged to keep also a device provided with the old style of spike-teeth for effecting the above-specified object. By my construction the need of said extra device is done away with.

In throwing the teeth in the soil I always carry lever B down horizontally parallel with the frame and catch it under hook *d*, secured to the frame, as I impart to said lever its capacity to control the depth of cut not by the common cumbersome and expensive ratchet devices, but by forming it with a row of holes at *n*, and pivotally connecting it with the shouldered bar *i'*, secured to beam *c* by means of a detachable bolt passing through it and the holes *n* of said arm B. This arm, with its bar *i'*, is pivoted to bar *a'* at *s*, Figs. 3 and 5, and bars $a'$ are pivoted to the shouldered bars $i$ at each end. By means of this construction of parts, and associating with them the circular teeth shown, the strength of a child is all that is necessary to carry the lever-arm at any and all angles shown or desired, and this, too, when the team is moving, whereas by other constructions very great exertion is required to raise the teeth even when the team is not moving.

When the end of the tooth working in the soil becomes dull the tooth may be changed end for end, when, by the action of the soil on the back face of the end $x$, when constituting a fulcrum and shoe respectively, it becomes sharpened ready for use by the time the other end is dulled. The sharpening of the point was effected by the construction in my former patent, but in a different and less practical manner, and by a construction in which many useful results of the present construction were not attained.

Deeming the operation sufficiently explained, what I desire to secure by Letters Patent, and claimed by me as new, is—

1. In a harrow, the frame having the revoluble tooth-beams provided with the extended portions to which the teeth are secured, in combination with the double-pointed circular teeth shown, all substantially as described.

2. In a harrow or cultivator, the frame having the revoluble tooth-beams provided with the extended portions to which the teeth are secured, and means for operating said beams, in combination with the double-pointed circular teeth, substantially as set forth, whereby the several uses of the teeth described and shown may be obtained by adjustment.

WILLIAM S. FOSTER.

Witnesses:
 OSCAR F. COLEMAN,
 JOHN H. CHASE.